US012111285B2

(12) United States Patent
Takahashi et al.

(10) Patent No.: US 12,111,285 B2
(45) Date of Patent: Oct. 8, 2024

(54) MASS SPECTROMETRY METHOD AND MASS SPECTROMETER

(71) Applicant: SHIMADZU CORPORATION, Kyoto (JP)

(72) Inventors: Hidenori Takahashi, Kyoto (JP); Sadanori Sekiya, Kyoto (JP); Shosei Yamauchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 16 days.

(21) Appl. No.: 17/767,946

(22) PCT Filed: Nov. 11, 2019

(86) PCT No.: PCT/JP2019/044183
§ 371 (c)(1),
(2) Date: Apr. 11, 2022

(87) PCT Pub. No.: WO2021/095105
PCT Pub. Date: May 20, 2021

(65) Prior Publication Data
US 2024/0102962 A1 Mar. 28, 2024

(51) Int. Cl.
G01N 27/62 (2021.01)
H01J 49/26 (2006.01)

(52) U.S. Cl.
CPC ............. G01N 27/62 (2013.01); H01J 49/26 (2013.01)

(58) Field of Classification Search
CPC ....... G01N 27/62; H01J 49/26; H01J 49/0045
USPC ........................................ 250/281, 282, 288
See application file for complete search history.

(56) References Cited

U.S. PATENT DOCUMENTS

2016/0372311 A1* 12/2016 Takahashi ............... H01J 49/06

FOREIGN PATENT DOCUMENTS

WO 2015133259 A1 9/2015

OTHER PUBLICATIONS

Luciano H. Di Stefano et al., "Size-Dependent Hydrogen Atom Attachment to Gas-Phase Hydrogen-Deficient Polypeptide Radical Cations", Journal of the American Chemical Society, Jan. 2, 2018, 3pgs.
Sebastian Wolf et al., "In silico fragmentation for computer assisted identification of metabolite mass spectra", BMC Bioinformatics, 2010, pp. 1-12, vol. 11, No. 148.

(Continued)

Primary Examiner — Michael Maskell
(74) Attorney, Agent, or Firm — Sughrue Mion, PLLC

(57) ABSTRACT

First product ion spectrum data is acquired by dissociating a precursor ion derived from a sample component by collision between the precursor ion and an inert gas molecule to generate product ions, and detecting the product ions after separating the product ions according to a mass-to-charge ratio; second product ion spectrum data is acquired by dissociating the precursor ion by a reaction of the precursor ion with hydrogen radicals to generate product ions, and detecting the product ions after separating the product ions according to a mass-to-charge ratio; and a set of product ions having a predetermined mass difference is extracted in the first product ion spectrum data and the second product ion spectrum data.

12 Claims, 5 Drawing Sheets

(56) References Cited

OTHER PUBLICATIONS

Hidenori Takahashi et al., " Hydrogen Attachment/Abstraction Dissociation (HAD) of Gas-Phase Peptide Ions for Tandem Mass Spectrometry", Analytical Chemistry, Mar. 22, 2016, pp. 3810-3816, vol. 88.
Written Opinion of the International Searching Authority for PCT/JP2019/044183 dated Jan. 28, 2020 (PCT/ISA/210).
International Search Report for PCT/JP2019/044183 dated Jan. 28, 2020 (PCT/ISA/210).
First Office Action dated Jan. 10, 2023 issued for the corresponding Japanese Patent Application No. 2021-555644.
Notice of Allowance dated Mar. 7, 2023 from the Japanese Patent Office in Application No. 2021-555644.

* cited by examiner

MASS SPECTROMETRY METHOD AND MASS SPECTROMETER

TECHNICAL FIELD

The present invention relates to a mass spectrometry method and a mass spectrometer.

BACKGROUND ART

Structural analyses of metabolites have been carried out for the purpose of identifying factors of diseases occurring in living bodies. Exhaustive structural analysis of low-molecular compounds (low-molecular metabolites) such as organic acids and amino acids is called metabolome analysis (or metabolomics). In the case of humans, there are 3000 or more kinds of metabolites to be subjected to metabolome analysis, and with their derivatives and intermediates in metabolic pathways included, there are more metabolites.

In the metabolome analysis, LC-MS/MS analysis using a liquid chromatograph mass spectrometer, which combines a liquid chromatograph and a mass spectrometer, is often performed. In the LC-MS/MS analysis, a liquid sample is introduced into a column of the liquid chromatograph to separate a sample component to be analyzed from other components, and the sample component is introduced into the mass spectrometer. In the mass spectrometer, the sample component is ionized, and ions having a specific mass-to-charge ratio are selected as precursor ions from among the generated ions. Subsequently, the precursor ions are dissociated to generate product ions. The generated product ions are then separated according to their mass-to-charge ratios, and the separated ions are detected so that data of the product ion spectrum is acquired.

As a representative method for dissociating ions in LC-MS/MS, a collision-induced dissociation (CID) method is known in which precursor ions are dissociated by collision of the precursor ions with inert gas molecules such as nitrogen gas. In the CID method, usually, kinetic energy is imparted to precursor ions to accelerate the precursor ions, and the precursor ions collide with inert gas molecules. In the CID method, ions are dissociated by the energy of collision with inert gas molecules, so that precursor ions can be dissociated at various portions (dissociation sites).

CITATION LIST

Patent Literature

Patent Literature 1: WO 2015/133259 A

Non Patent Literature

Non Patent Literature 1: Luciano H. Di Stefano, Dimitris Papanastasiou, and Roman A. Zubarev, "Size-Dependent Hydrogen Atom Attachment to Gas-Phase Hydrogen-Deficient Polypeptide Radical Cations", J. Am. Chem. Soc. 2018, 140, 2, 531-533

Non Patent Literature 2: Wolf, S., Schmidt, S., Muller-Hannemann, M., & Neumann, S., "In silico fragmentation for computer assisted identification of metabolite mass spectra", BMC Bioinformatics, 11, (2010), 148.

Non Patent Literature 3: Hidenori Takahashi, Sadanori Sekiya, Takashi Nishikaze, Kei Kodera, Shinichi Iwamoto, Motoi Wada, Koichi Tanaka, "Hydrogen Attachment/Abstraction Dissociation (HAD) of Gas-Phase Peptide Ions for Tandem Mass Spectrometry.", Anal. Chem. 2016, 88 (7), pp 3810-3816

SUMMARY OF INVENTION

Technical Problem

In the CID method, precursor ions are dissociated at various sites, and the selectivity of the dissociation sites is low. Metabolites to be subjected to metabolome analysis are generally organic compounds, and many of them have a cyclic moiety. Therefore, the information on how the product ions detected by LC-MS/MS analysis are generated, i.e. whether they are generated by dissociation of the cyclic moiety (ring cleavage) or dissociation of the chain moiety (cleavage of the chain moiety) of the precursor ion, is useful for structural analysis. However, there is a problem that it is difficult to obtain such information by the CID method.

An object of the present invention is to provide a technique capable of obtaining information on how the product ions are generated by dissociation of precursor ions derived from sample component that is an organic compound, i.e. whether they are generated by dissociation of the cyclic moiety (ring cleavage) or dissociation of the chain moiety (cleavage of the chain moiety) of the precursor ion.

Solution to Problem

A mass spectrometry method according to the present invention made to solve the above problems includes steps of:
  acquiring first product ion spectrum data by dissociating a precursor ion derived from a sample component by collision between the precursor ion and an inert gas molecule to generate product ions, and detecting the product ions after separating the product ions according to a mass-to-charge ratio;
  acquiring second product ion spectrum data by dissociating the precursor ion by a reaction of the precursor ion with hydrogen radicals to generate product ions, and detecting the product ions after separating the product ions according to a mass-to-charge ratio; and
  extracting a set of product ions having a predetermined mass-to-charge ratio difference in the first product ion spectrum data and the second product ion spectrum data.

A mass spectrometer according to another mode of the present invention made to solve the above problems includes:
  a reaction chamber into which a precursor ion derived from a sample component is introduced;
  an inert gas introducing section configured to introduce an inert gas into the reaction chamber;
  a hydrogen radical introducing section configured to introduce hydrogen radicals into the reaction chamber;
  an ion detecting section configured to detect ions emitted from the reaction chamber after separating the ions according to a mass-to-charge ratio;
  a first measurement controller which is a controller configured to control the inert gas introducing section and the ion detecting section, the first measurement controller configured to dissociate the precursor ion by collision between the precursor ion and an inert gas molecule to generate product ions, and acquire first product ion spectrum data by detecting the product ions by the ion detecting section;

a second measurement controller which is a controller configured to control the hydrogen radical introducing section and the ion detecting section, the second measurement controller configured to dissociate the precursor ion by a reaction between the precursor ion and hydrogen radicals to generate product ions, and acquire second product ion spectrum data by detecting the product ions by the ion detecting section; and a product ion set extractor configured to extract a set of product ions having a predetermined mass difference in the first product ion spectrum data and the second product ion spectrum data obtained for a same precursor ion.

Advantageous Effects of Invention

The mass spectrometry method and the mass spectrometer according to the present invention are mainly used for analysis of a sample component that is an organic compound, and acquire first product ion spectrum data by generating product ions by the CID method in which precursor ions derived from the sample component are dissociated by collision between the precursor ions and inert gas molecules, separating the product ions according to their mass-to-charge ratios, and then detecting the separated product ions. The mass spectrometry method and the mass spectrometer acquire second product ion spectrum data by generating product ions by a hydrogen-attached dissociation (HAD) method in which precursor ions derived from a sample component are dissociated by a reaction between precursor ions and hydrogen radicals, separating the product ions according to their mass-to-charge ratios, and then detecting the separated product ions. According to the measurement carried out by the inventors, it has been found that product ions generated by dissociation of precursor ions in the chain moiety have no difference in the mass-to-charge ratio of product ions between dissociation by CID and dissociation by HAD, whereas product ions generated by dissociation of precursor ions in the cyclic moiety have a specific difference (typically 2 Da) in the mass-to-charge ratio in the product ions between dissociation by CID and dissociation by HAD. The mass spectrometry method and the mass spectrometer according to the present invention are based on this finding, and extract a set of product ions having a predetermined mass-to-charge ratio difference in the first product ion spectrum data and the second product ion spectrum data obtained for the same precursor ion. Consequently, it is possible to estimate that the extracted set of product ions have been generated by dissociation of precursor ions in the cyclic moiety.

DESCRIPTION OF EMBODIMENTS

An embodiment of an ion analyzer according to the present invention will be described below with reference to the drawings. The ion analyzer of the embodiment is an ion-trap time-of-flight (IT-TOF) mass spectrometer.

Figure 1:
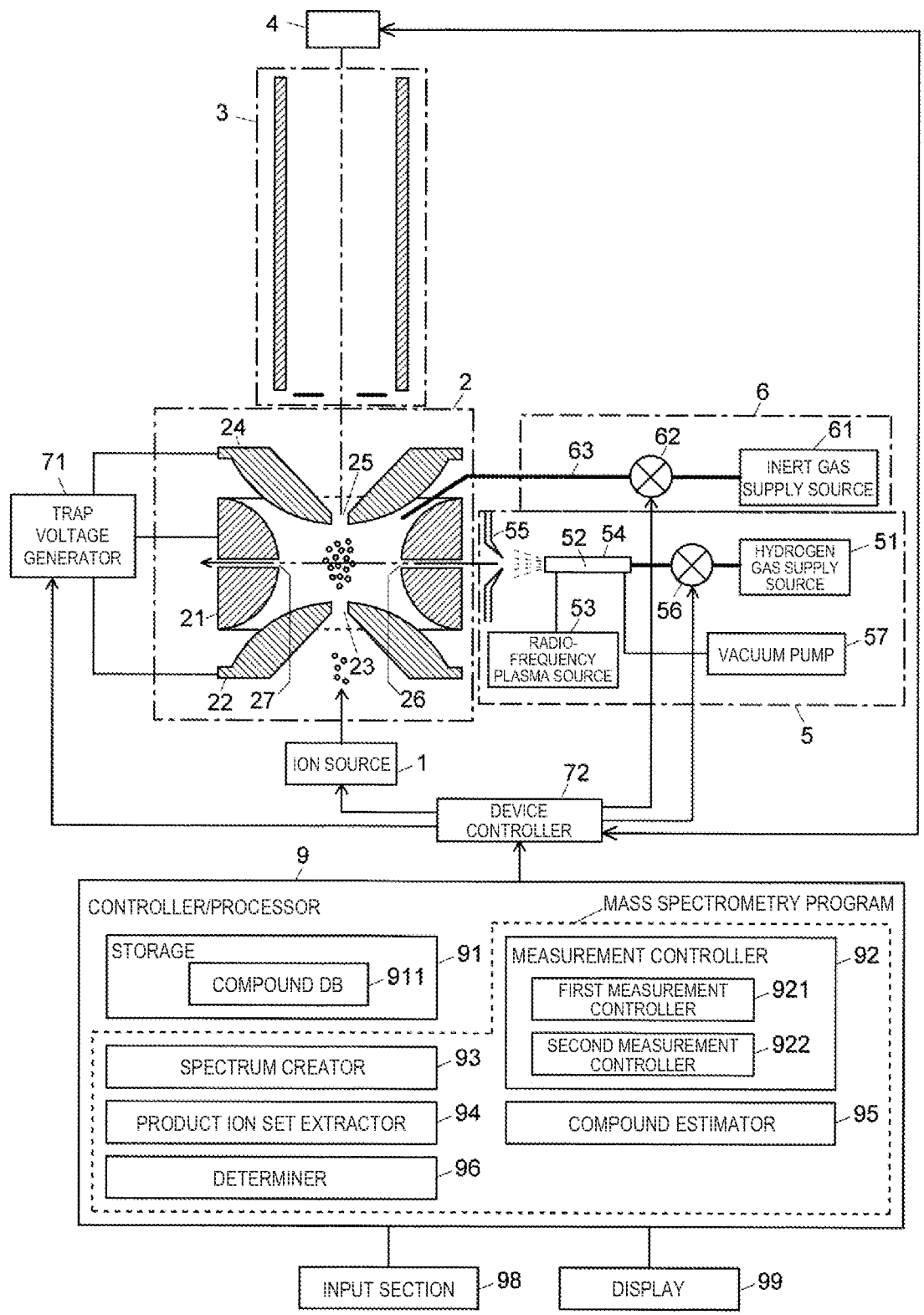
FIG. 1 is a configuration diagram of a main part of an embodiment of a mass spectrometer according to the present invention.

FIG. 1 shows a schematic configuration of an ion-trap time-of-flight mass spectrometer (hereinafter, it is also simply referred to as "mass spectrometer") of the embodiment. The mass spectrometer of the embodiment has a vacuum chamber (not shown) in which a predetermined vacuum atmosphere is maintained, with the following devices provided inside: an ion source 1 for ionizing a component in a sample, an ion trap 2 for capturing the ions generated by the ion source 1, by the effect of a radio-frequency electric field; a time-of-flight mass separator 3 for separating the ions emitted from the ion trap 2 according to their mass-to-charge ratios; and an ion detector 4 for detecting the separated ions. Additionally, the ion trap mass spectrometer of the present embodiment includes a radical generator/irradiator 5 for introducing hydrogen radicals into the ion trap 2, an inert gas supplier 6 for introducing an inert gas into the ion trap 2, a trap voltage generator 71, a device controller 72, and a controller/processor 9.

As the ion source 1 of the mass spectrometer of the present embodiment, an appropriate ion source suitable for ionization of sample components, such as an ESI source or a MALDI ion source, is used. The ion trap 2 of the present embodiment is a three-dimensional ion trap including an annular ring electrode 21 as well as a pair of end-cap electrodes (entrance end-cap electrode 22 and exit end-cap electrode 24) facing each other across the ring electrode 21. A radical introduction hole 26 and a radical discharge hole 27 are formed in the ring electrode 21. An ion introduction hole 23 is formed in the entrance end-cap electrode 22. Furthermore, an ion emission hole 25 is formed in the exit end-cap electrode 24.

The time-of-flight mass separator 3 includes a plurality of electrodes, and causes ions emitted from the ion trap 2 to be incident onto the ion detector 4. Under the command from the device controller 72, the trap voltage generator 71 applies either a radio-frequency voltage or direct-current voltage, or a voltage composed of these two kinds of voltages, to each of the ring electrode 21, the entrance end-cap electrode 22, the exit end-cap electrode 24, and the electrode of the time-of-flight mass separator 3 at a predetermined timing.

The radical generator/irradiator 5 includes a nozzle 54 having inside of which a radical generation chamber 52 is formed, a vacuum pump (vacuum exhauster) 57 for exhausting the radical generation chamber 52, and an inductively coupled radio-frequency plasma source 53 for supplying a microwave for generating vacuum discharge in the radical generation chamber 52. The radical generator/irradiator 5 includes a hydrogen gas supply source 51 for supplying hydrogen gas as a source of radicals. A valve 56 for controlling the flow rate of the hydrogen gas is provided in a flow path for supplying the source gas from the hydrogen gas supply source 51 to the radical generation chamber 52. A skimmer 55 is provided ahead of the discharge hole of the nozzle 54, and this skimmer 55 removes gas molecules, while the hydrogen radicals form a thin beam. In the present embodiment, hydrogen radicals are generated using hydrogen gas as a source, but hydrogen radicals can also be generated using another kind of gas such as water vapor as a source gas.

Figure 2:
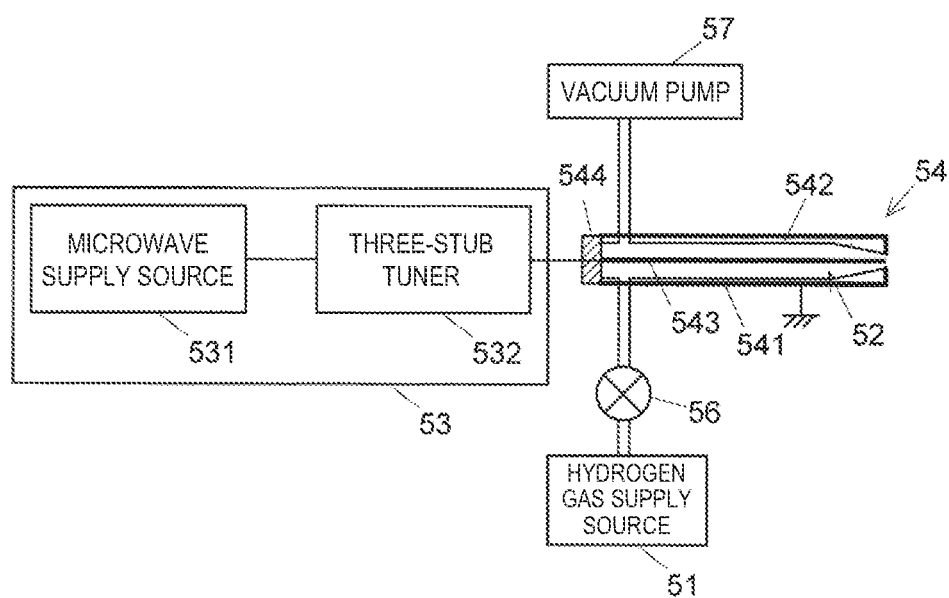
FIG. 2 is a view illustrating a configuration of a radical generator/irradiator of the mass spectrometer of the present embodiment.

As shown in FIG. 2, the radio-frequency plasma source 53 includes a microwave supply source 531 and a three-stub tuner 532. The nozzle 54 includes a ground electrode 541 constituting an outer periphery and a torch 542 inside the ground electrode 541, and the inside of the torch 542 serves as the radical generation chamber 52. Inside the radical generation chamber 52, a needle electrode 543 connected to the radio-frequency plasma source 53 via a connector 544 penetrates in the longitudinal direction of the radical generation chamber 52. As the torch 542, a torch having electrical insulation properties, for example, a torch made of glass can be used, and an example of it includes Pyrex (registered trademark) glass.

The inert gas supplier 6 includes an inert gas supply source 61 for supplying an inert gas such as helium gas, nitrogen gas, or argon gas, and a gas flow path 63 for introducing the inert gas supplied from the inert gas supply source into the ion trap 2. The amount of inert gas supplied to the ion trap 2 is controlled by the valve 62.

The controller/processor 9 includes, in addition to a storage 91, a measurement controller 92, a spectrum creator 93, a product ion set extractor 94, a compound estimator 95, and a determiner 96 as functional blocks. The storage 91 stores a compound database (compound DB) 911 for storing, for each of a plurality of known compounds, information in which a name, product ion spectrum data, measurement conditions relating to acquisition of the data, and the like are associated with one another. In the compound database of the present embodiment, both product ion spectrum data acquired by the collision-induced dissociation (CID) method and product ion spectrum data acquired by the hydrogen-attached dissociation (HAD) method are stored for each compound. The compound database also stores time-of-flight mass-to-charge ratio conversion information in which the time of flight of the ions and the mass-to-charge ratio of the ions in the time-of-flight mass separator 3 are associated with each other. The measurement controller 92 includes a first measurement controller 921 and a second measurement controller 922. An entity of the controller/processor 9 is a general computer, and each of the above-described functional blocks is embodied by a processor executing a mass spectrometry program installed in advance. An input section 98 and a display 99 are connected to the controller/processor 9.

Next, an analyzing operation in the mass spectrometer of the embodiment is described. When the user issues a command for starting measurement, the first measurement controller 921 causes each section of the mass spectrometer to operate as follows.

First, a vacuum pump (not shown) exhausts the inside of the vacuum chamber to a predetermined degree of vacuum. Subsequently, the sample component is ionized in the ion source 1, and the generated ions are emitted from the ion source 1 in a packet-like form. Ions emitted from the ion source 1 are introduced into the ion trap 2 through an ion introduction hole 23 formed in the entrance end-cap electrode 22. The ions introduced into the ion trap 2 are captured by the radio-frequency electric field formed within the ion trap 2 by the voltage applied to the ring electrode 21 and other electrodes from the trap voltage generator 71. After that, predetermined voltages are applied from the trap voltage generator 71 to the ring electrodes 21 and other electrodes, whereby the ions included in a mass-to-charge-ratio range exclusive of the ion having a specific mass-to-charge ratio of interest are excited, to be eventually removed from the ion trap 2. Consequently, ions (typically singly-charged proton-added molecular ions $[M+H]^+$) having a specific mass-to-charge ratio are selectively captured in the ion trap 2.

Subsequently, the valve 62 of the inert gas supplier 6 is opened, and an inert gas such as nitrogen gas is introduced into the ion trap 2 from the inert gas supply source 61 at a specific flow rate. Consequently, the precursor ions are cooled and focused into a region around the center of the ion trap 2. Thereafter, a predetermined radio-frequency voltage is applied from the trap voltage generator 71 to each of the ring electrode 21, the entrance end-cap electrode 22, and the exit end-cap electrode 24 constituting the ion trap 2, and a radio-frequency electric field is formed in the ion trap 2 to vibrate the precursor ions. The precursor ions to which kinetic energy is imparted by vibration are dissociated by collision with the inert gas introduced into the ion trap 2 to generate product ions. The precursor ions are excited for a predetermined period of time, and during that time, the precursor ions are dissociated by collision with the inert gas to generate product ions. The opening of the valve 62 and the time for exciting the precursor ions can be determined in advance based on the results of the preliminary experiment and the like.

The generated product ions are temporarily captured in the ion trap 2. Thereafter, a direct-current voltage is applied from the trap voltage generator 71 to the entrance end-cap electrode 22 and the exit end-cap electrode 24 to form a potential gradient in the ion trap 2. Consequently, a specific amount of acceleration energy is imparted to the product ions captured in the ion trap 2, and the product ions are simultaneously emitted from the ion emission hole 25.

Product ions having a specific amount of acceleration energy are introduced into the flight space of the time-of-flight mass separator 3. While flying through the flight space, those ions are separated according to their mass-to-charge ratios. The ion detector 4 sequentially detects the separated ions. The output signals from the ion detector 4 are sequentially stored in the storage 91.

When the measurement by the first measurement controller 921 is completed, the second measurement controller 922 operates each section of the mass spectrometer as follows.

First, a vacuum pump (not shown) exhausts the inside of the vacuum chamber to a predetermined degree of vacuum, and the vacuum pump 57 exhausts the inside of the radical generation chamber 52 to a predetermined degree of vacuum. The valve 56 of the radical generator/irradiator 5 is opened, and hydrogen gas is supplied from the hydrogen gas supply source 51 to the radical generation chamber 52. Furthermore, microwaves are supplied from the microwave supply source 531 to generate hydrogen radicals in the radical generation chamber 52.

Subsequently, the sample component is ionized in the ion source 1, and the generated ions are emitted from the ion source 1 in a packet-like form. Ions emitted from the ion source 1 are introduced into the ion trap 2 through an ion introduction hole 23 formed in the entrance end-cap electrode 22. The ions introduced into the ion trap 2 are captured by the radio-frequency electric field formed within the ion trap 2 by the voltage applied to the ring electrode 21 and other electrodes from the trap voltage generator 71. After that, predetermined voltages are applied from the trap voltage generator 71 to the ring electrodes 21 and other electrodes, whereby the ions included in a mass-to-charge-ratio range exclusive of the ion having a specific mass-to-charge ratio of interest are excited, to be eventually removed from the ion trap 2. Consequently, ions (typically singly-charged proton-added molecular ions [M+H]$^+$) having a specific mass-to-charge ratio are selectively captured in the ion trap 2.

Thereafter, a stream of gas containing hydrogen radicals generated in the radical generation chamber 52 of the radical generator/irradiator 5 is jetted from the nozzle 54. The hydrogen radicals discharged from the nozzle 54 pass through the skimmer 55 and are introduced into the ion trap 2.

The opening of the valve 56 and the like are appropriately adjusted so that the flow rate of radicals cast onto the ions at this time becomes a predetermined flow rate. Furthermore, the period of time for the irradiation of the radicals onto the precursor ions is also set appropriately. The opening of the valve 56 and the period of time for the irradiation of the radicals can be previously determined based on a result of a preliminary experiment or the like. The radicals introduced into the ion trap 2 adhere to the precursor ions and cause the precursor ions to undergo radical induced dissociation. Consequently, product ions are generated.

The generated product ions are temporarily captured in the ion trap 2. Thereafter, a direct-current voltage is applied from the trap voltage generator 71 to the entrance end-cap electrode 22 and the exit end-cap electrode 24 to form a potential gradient in the ion trap 2. Consequently, a specific amount of acceleration energy is imparted to the product ions captured in the ion trap 2, and the product ions are simultaneously emitted from the ion emission hole 25.

Product ions having a specific amount of acceleration energy are introduced into the flight space of the time-of-flight mass separator 3. While flying through the flight space, those ions are separated according to their mass-to-charge ratios. The ion detector 4 sequentially detects the separated ions. The output signals from the ion detector 4 are sequentially stored in the storage 91.

When the measurement by the second measurement controller 922 is completed, the spectrum creator 93 creates a time-of-flight spectrum with the point in time of the emission of the ions from the ion trap 2 as the zero point of time. Then, the spectrum creator 93 converts the time-of-flight values into mass-to-charge ratios based on the time-of-flight mass-to-charge ratio conversion information saved in the storage 91, thereby creating the product ion spectrum data of the first measurement (CID method) and the product ion spectrum data of the second measurement (HAD method).

When the product ion spectrum data of the first measurement and the product ion spectrum data of the second measurement are created, the product ion set extractor 94 compares the mass-to-charge ratios of the peaks included in these product ion spectrum data with each other. Then, the product ion set extractor 94 extracts a set of product ions having a predetermined mass-to-charge ratio difference.

Here, the present inventors infer the dissociation of precursor ions by the CID method and the dissociation of precursor ions by the HAD method as follows.

When precursor ions are dissociated by the CID method, both the product ions immediately after dissociation and the remaining portion of the precursor ions (the remaining portion where the product ions are desorbed from the precursor ions) may become unstable radical species. When product ions are generated by cleavage of the cyclic moiety of the precursor ions, the precursor ions are not separated into the product ions and the remaining portion of the precursor ions unless the rings are cleaved at two positions. Therefore, at the point in time when one ring cleavage occurs, the cleavage sites are close to each other, and hydrogen radicals are transferred between them. At the same time (or slightly later), when ring cleavage occurs at another position of the same ring, the product ions and the remaining portion of the precursor ions are separated away from each other. When hydrogen radicals are transferred from product ions to the remaining portion of precursor ions in the process of dissociating the precursor ions in the cyclic moiety, the product ions are stabilized as ions of the non-radical species, and the remaining portion of the precursor ions is also stabilized as neutral molecules of the non-radical species. Conversely, when the hydrogen radicals are transferred from the remaining portion of the precursor ions to the product ions, the product ions are stabilized as ions of the non-radical species, and the remaining portion of the precursor ions is also stabilized as neutral molecules of the non-radical species (for example, Non Patent Literature 1).

That is, in the CID method, when the precursor ions are dissociated in the cyclic moiety, the hydrogen radicals are separated from the product ions of the radical species, or the hydrogen radicals adhere to the product ions of the radical species, thereby forming the product ions of the non-radical species, and thus, the mass of the product ions of the non-radical species to be detected changes by ±1 Da from the product ions of the radical species at the point in time of generation. When the precursor ions are dissociated in the chain moiety, the product ions and the remaining portion of the precursor ions are immediately separated from each other, so that the transfer of hydrogen radicals as described above is less likely to occur.

On the other hand, also when the precursor ions are dissociated by the HAD method, immediately after the dissociation, both the product ions and the remaining portion of the precursor ions (the remaining portion where the product ions are desorbed from the precursor ions) may become unstable radical species. However, since a large amount of hydrogen radicals are introduced into the ion trap 2 in the HAD method, the hydrogen radicals adhere to both the product ions as radical species and the remaining portion of the precursor ions as radical species, the product ions are stabilized as ions of the non-radical species, and the remaining portion of the precursor ions is also stabilized as neutral molecules of the non-radical species. That is, in the HAD method, since the hydrogen radicals adhere to the product ions, the mass of the product ions changes by +1 Da.

In the CID method, the mass of product ions generated by dissociation of the cyclic moiety of the precursor ions changes by +1 Da. In the HAD method, the mass of product ions generated by dissociation of the cyclic moiety of the precursor ions changes by +1 Da. Thus, a difference of 2 Da can occur in product ions generated by dissociation of the cyclic moiety of the precursor ions. Therefore, by extracting a set of product ions having a mass difference of 2 Da from the product ion spectrum data acquired by these two methods, it is possible to estimate that the product ions of the set have occurred by dissociation of the cyclic moiety of the precursor ions.

Since the above mass difference can occur for each dissociation site, a mass difference of 2 Da or more further occurs when the precursor ions are dissociated at a plurality of positions of the cyclic moiety. Therefore, the predetermined mass difference can include not only those of 2 Da but also those of 4 Da or 6 Da.

When the product ion set extractor 94 extracts the set of product ions having the predetermined mass difference, the compound estimator 95 collates the product ion spectrum data of the first measurement with the product ion spectrum data of the CID method stored in the compound database 911. Then, the compound estimator 95 obtains a score from the positions of peaks (mass-to-charge ratios of product ions) and the degree of coincidence of intensities included in the product ion spectrum data, and selects a predetermined number of compounds as compound candidates in descending order of score. The score may be calculated before or in parallel with the extraction of the set of product ions.

Next, the determiner 96 adds a predetermined score to the score of a compound candidate in a case where the mass-to-charge ratio of the product ions generated by the CID method among the product ion sets extracted by the product ion set extractor 94 can occur by dissociation of the cyclic moiety of a predetermined precursor ion (usually, a singly-charged proton-added molecular ion) derived from the compound candidate (i.e., product ions having the mass-to-charge ratio can be generated by dissociation of the cyclic moiety). The score to be added can be appropriately determined, and for example, in a case where a compound having a characteristic in the number or structure of the cyclic moiety is to be identified, the score to be added can be increased. After performing these processes, the compound estimator 95 displays the name of the compounds and the mass spectrum acquired by the CID method on the display 99 for a predetermined number of compound candidates in descending order of score, together with the product ion spectrum of the first measurement. Here, the score is added based on the determination result by the determiner 96, but only those capable of generating the product ions by dissociation of the cyclic moiety may be left as compound candidates.

Here, the case where the compound candidates are selected using the product ion spectrum data of the first measurement (CID method) has been described as an example, but the same processing as described above can also be performed using the product ion spectrum data of the second measurement (HAD method). In that case, the score may be obtained by spectrum matching using the product ion spectrum data acquired by the HAD method stored in the compound database 911.

Instead of selecting a compound candidate by performing spectrum matching between the product ion spectrum data stored in the compound database 911 and the product ion spectrum data obtained by actual measurement, a compound candidate may be obtained by performing dissociation simulation of precursor ions using a computer based on information on a peak position (mass-to-charge ratio) and intensity included in mass spectrum data obtained by a chemical formula estimated as a sample component and actual measurement. As such software, for example, MetFrag (see Non Patent Literature 2) can be used.

Figure 3:
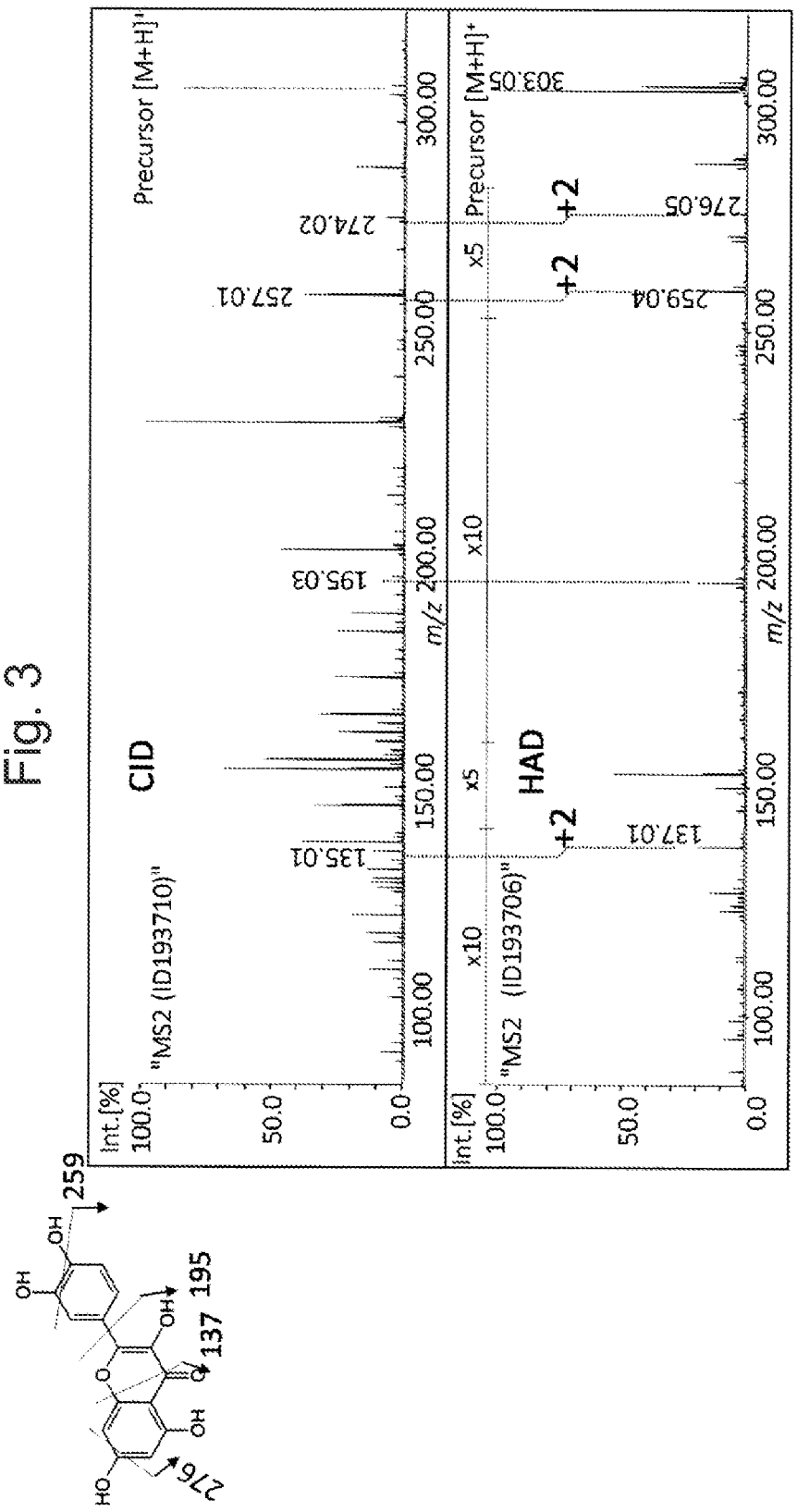
FIG. 3 is a view illustrating a result of measuring quercetin using the mass spectrometer of the present embodiment.

Next, an actual measurement example using the mass spectrometer of the above embodiment will be described. FIG. 3 shows a measurement result of quercetin. The upper part shows the product ion spectrum obtained in the first measurement (CID method), and the lower part shows the product ion spectrum obtained in the second measurement (HAD method).

As shown in FIG. 3, the product ion spectrum obtained in the first measurement has four peaks having mass-to-charge ratios of 135.01, 195.03, 257.01, and 274.02. On the other hand, the product ion spectrum obtained in the second measurement has four peaks having mass-to-charge ratios of 137.01, 195.03, 259.04, and 276.05. That is, there are three sets (first measurement/second measurement: 135.01/137.01, 257.01/259.04, 274.02/276.05) of product ions having a mass difference of 2 Da. There is one set of product ions having the same mass (195.03). As shown at each of the positions shown in the upper left of FIG. 3, it is found that all the sets of product ions having a mass difference of 2 Da are generated by dissociation of the cyclic moiety, and the set of product ions having the same mass is generated by dissociation of the chain moiety. In the molecular structure shown in the upper left of FIG. 3, the mass of product ions generated by the second measurement (HAD method) is described.

Figure 4:
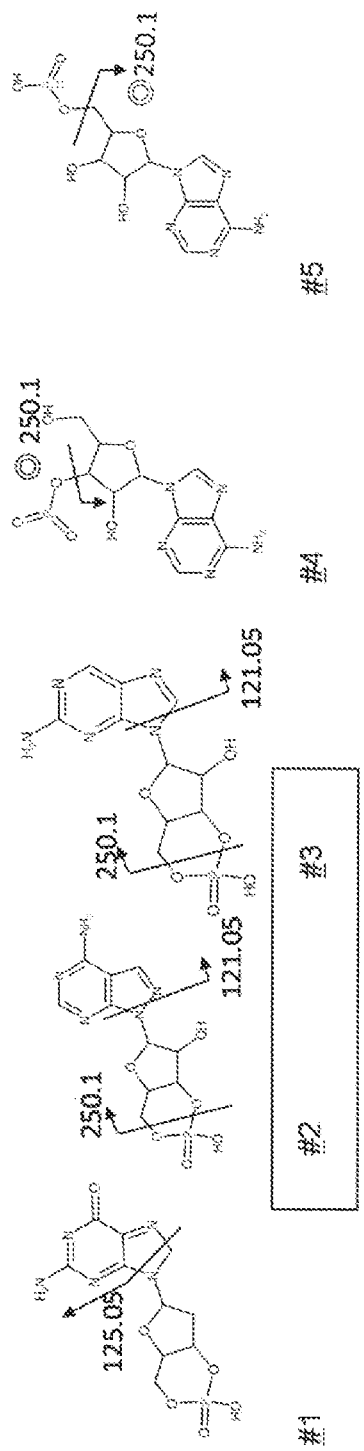
FIG. 4 is a view illustrating a result of identifying a model sample using the mass spectrometer of the present embodiment.
Figure 4:
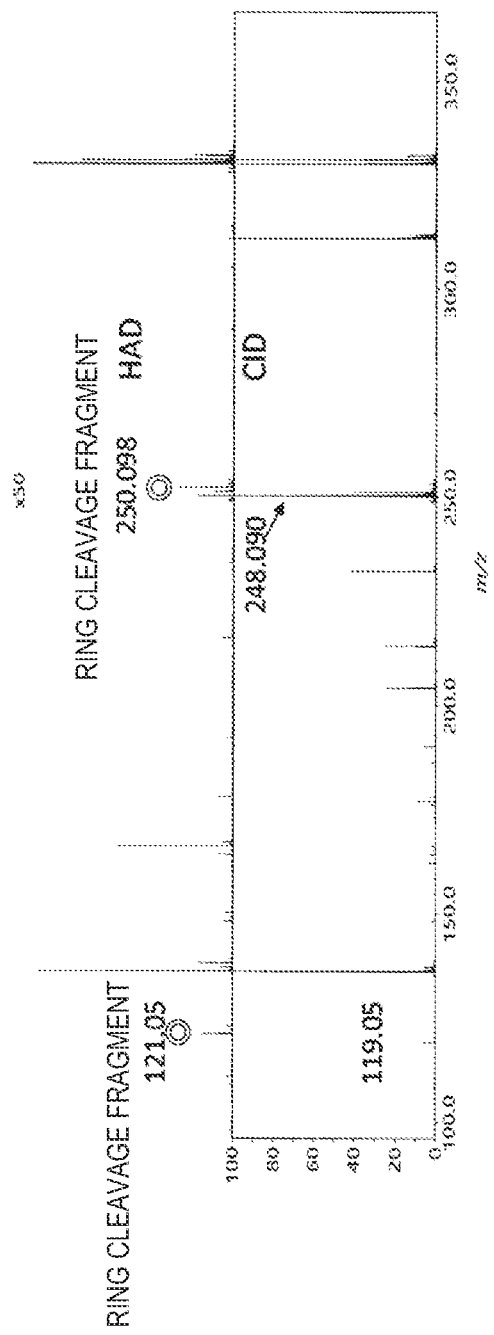

Next, an identification example of a model sample (cAMP, CAS_ID 60-92-4) using the mass spectrometer of the above embodiment will be described. In the measurement result shown in the lower part of FIG. 4, the upper part shows the product ion spectrum obtained in the second measurement (HAD method), and the lower part shows the product ion spectrum obtained in the first measurement (CID method). The upper part of FIG. 4 shows the top five compound candidates arranged in descending order of the score, the compound candidates obtained by inputting the product ion spectrum obtained by the second measurement (HAD method) into MetFrag (see Non Patent Literature 2), which is an in silico (computer simulation) fragment analysis tool. At this point in time, five compounds are present as candidates. Of them, #2 is a correct compound but there is a compound (#1) having a score higher than that.

However, in the compound of #1, since product ions of 121.05 Da are not generated by dissociation of the cyclic moiety, the determiner 96 can exclude the compound from the compound candidates (or lower the rank of the compound candidate) in the present embodiment. In the compounds #4 and #5, since product ions of 250.098 Da are generated by dissociation of the chain moiety, these can also be excluded from the candidates (or the rank of the compound candidate can be lowered). In this manner, the candidates for the model compound can be narrowed down to #2 and #3, and the compound of #2, which is correct, becomes the highest candidate.

The above embodiment is merely an example, and can be appropriately modified in accordance with the spirit of the present invention. In the above embodiment, the mass spectrometer includes a three-dimensional ion trap. Alternatively, the mass spectrometer can include a linear ion trap (collision cell).

Figure 5:
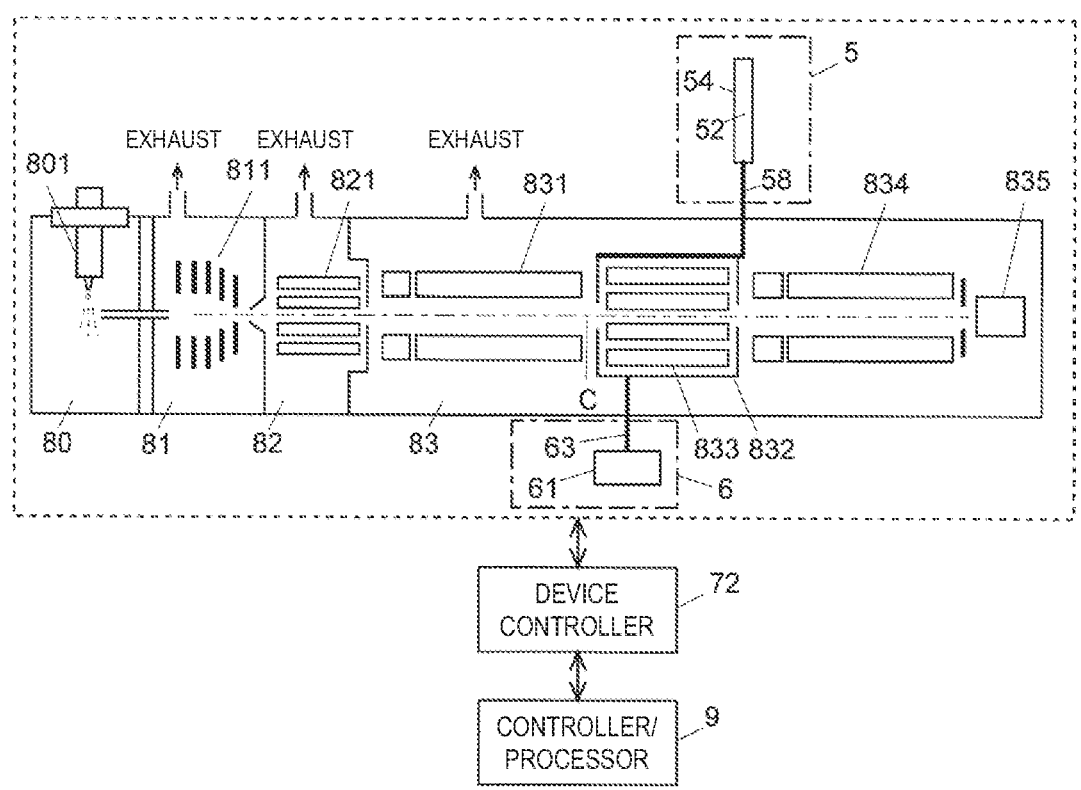
FIG. 5 is a configuration diagram of a main part of a mass spectrometer of a modification.

FIG. 5 shows a schematic configuration diagram of a mass spectrometer of a modification. The same components as those in the above embodiment are denoted by the same reference numerals, and the description thereof will be omitted. Since the configurations of the radical generator/irradiator, the inert gas supplier 6, and the controller/processor 9 are the same as those in the above embodiment, detailed components are not illustrated.

The mass spectrometer of the modification has a configuration of a multi-stage differential exhaust system including a first intermediate vacuum chamber 81 and a second intermediate vacuum chamber 82 in which the degree of vacuum is increased stepwise between an ionization chamber 80 at substantially atmospheric pressure and a high-vacuum analysis chamber 83 vacuum exhausted by a vacuum pump (not shown). In the ionization chamber 80, for example, an ESI probe 801 is installed. In order to transport ions to the subsequent stage while converging the ions, an ion guide 811 is installed in the first intermediate vacuum chamber 81, and an ion guide 821 is installed in the second intermediate vacuum chamber 82. In the analysis chamber 83, a front-stage quadrupole mass filter 831 for separating ions according to their mass-to-charge ratios, a collision cell 832 in which a multipole ion guide 833 is installed, a rear-stage quadrupole mass filter 834 for separating ions according to their mass-to-charge ratios, and an ion detector 835 are installed.

The radical generator/irradiator 5 has the same configuration as that of the above embodiment (FIG. 5 illustrates only the radical generation chamber 52, the nozzle 54, and a transport pipe 58 in the radical generator/irradiator 5). The transport pipe 58 is disposed such that its tip end is along a wall surface of the collision cell 832. In the transport pipe 58, a part disposed along the wall surface of the collision cell 832 is provided with five heads, and radicals are injected from each head in a direction intersecting the flight direction of ions (ion optical axis C. Center axis of ion flight path). In the mass spectrometer of the modification, precursor ions are selected by the front-stage quadrupole mass filter 831 from the ions generated in the ionization chamber 80, and introduced into the collision cell 832. Then, hydrogen radicals are introduced into the collision cell 832 from the radical generator/irradiator 5 by the second measurement controller 922, and precursor ions are dissociated by the HAD method to generate product ions.

The inert gas supplier 6 also has a configuration similar to that of the above embodiment (the valve 62 is not shown in FIG. 5). Then, the first measurement controller 921 introduces an inert gas from the inert gas supplier 6 into the collision cell 832, and dissociates precursor ions by the CID method to generate product ions.

In the above embodiment, the time-of-flight mass separator is a linear type, although a time-of-flight mass separator such as a reflectron or multi-turn type may also be used. Furthermore, a different type of mass separator other than the time-of-flight mass separator can also be used, for example, the ion separation function of the ion trap 2 itself can be used for the mass separation, or an orbitrap may also be used.

In the above embodiment, the inductively coupled radio-frequency plasma source 53 is used as the radical generator/irradiator 5, but a thermal dissociation type hydrogen radical source (see Patent Literature 1 and Non Patent Literature 3) can also be used. A radical generator/irradiator including a thermal dissociation type hydrogen radical source includes a source gas supply source for supplying hydrogen gas, a capillary into which the hydrogen gas is introduced, a heater for heating the capillary, and a valve for adjusting the flow rate of the hydrogen gas introduced into the capillary. Hydrogen gas is thermally dissociated in the heated capillary to generate hydrogen radicals, and the hydrogen radicals are introduced into the ion trap.

[Modes]

It is understood by those skilled in the art that the plurality of exemplary embodiments described above are specific examples of the following modes.

(Clause 1)

A mass spectrometry method according to a mode of the present invention includes steps of:
  acquiring first product ion spectrum data by dissociating a precursor ion derived from a sample component by collision between the precursor ion and an inert gas molecule to generate product ions, and detecting the product ions after separating the product ion according to a mass-to-charge ratio;
  acquiring second product ion spectrum data by dissociating the precursor ion by a reaction of the precursor ion with hydrogen radicals to generate product ions, and detecting the product ions after separating the product ions according to a mass-to-charge ratio; and
  extracting a set of product ions having a predetermined mass-to-charge ratio difference in the first product ion spectrum data and the second product ion spectrum data.

(Clause 7)

A mass spectrometer according to another mode of the present invention includes:
  a reaction chamber into which a precursor ion derived from a sample component is introduced;
  an inert gas introducing section configured to introduce an inert gas into the reaction chamber;
  a hydrogen radical introducing section configured to introduce hydrogen radicals into the reaction chamber;
  an ion detecting section configured to detect ions emitted from the reaction chamber after separating the ions according to a mass-to-charge ratio;
  a first measurement controller which is a controller configured to control the inert gas introducing section and the ion detecting section, the first measurement controller configured to dissociate the precursor ion by collision between the precursor ion and an inert gas molecule to generate product ions, and acquire first product ion spectrum data by detecting the product ions by the ion detecting section;
  a second measurement controller which is a controller configured to control the hydrogen radical introducing section and the ion detecting section, the second measurement controller configured to dissociate the precursor ion by a reaction between the precursor ion and hydrogen radicals to generate product ions, and acquire second product ion spectrum data by detecting the product ions by the ion detecting section; and
  a product ion set extractor configured to extract a set of product ions having a predetermined mass difference in the first product ion spectrum data and the second product ion spectrum data obtained for a same precursor ion.

The mass spectrometry method described in Clause 1 and the mass spectrometer described in Clause 7 are used for analysis of a sample component that is an organic compound in particular, and acquire first product ion spectrum data by detecting product ions generated by the CID method for dissociating precursor ions by collision between precursor ions derived from the sample component and inert gas molecules after separating the product ions according to their mass-to-charge ratios. The mass spectrometry method and the mass spectrometer acquire second product ion spectrum data by detecting product ions generated by the HAD method for dissociating precursor ions by a reaction between precursor ions derived from a sample component and hydrogen radicals after separating the product ions according to their mass-to-charge ratios. According to the measurement carried out by the inventors, it has been found that product ions generated by dissociation of precursor ions in the chain moiety have no difference in the mass-to-charge ratio of product ions to be generated between dissociation of precursor ions by the CID method and dissociation of precursor ions by the HAD method, whereas product ions generated by dissociation of precursor ions in the cyclic moiety have a specific mass difference (typically 2 Da) in the product ions. The mass spectrometry method described in Clause 1 and the mass spectrometer described in Clause 7 are based on this finding, and extract a set of product ions having a predetermined mass-to-charge ratio difference in the first product ion spectrum data and the second product ion spectrum data obtained for the same precursor ion. Consequently, it is possible to estimate that the extracted set of product ions have been generated by dissociation of precursor ions in the cyclic moiety.

(Clause 2)

In the mass spectrometry method described in Clause 1, the predetermined mass difference is 2 Da.

(Clause 8)

In the mass spectrometer described in Clause 7, the predetermined mass difference is 2 Da.

In the mass spectrometry method described in Clause 2 and the mass spectrometer described in Clause 8, a set of product ions having a mass difference of 2 Da, which is the most common set, can be extracted from sets of product ions generated by dissociation of the cyclic moiety of the precursor ion by the CID method and product ions generated by dissociation of the cyclic moiety of the precursor ion by the HAD method.

(Clause 3)

In the mass spectrometry method described in Clause 1 or 2, it is determined whether or not the extracted set of product ions is generated by dissociation of a cyclic moiety of the precursor ion.

(Clause 9)

The mass spectrometer described in Clause 7 or 8 further includes a determiner for determining whether or not the set of product ions extracted by the product ion set extractor is generated by dissociation of a cyclic moiety of a precursor ion derived from the compound candidate.

In the mass spectrometry method described in Clause 3 and the mass spectrometer described in Clause 9, accuracy of estimation of a compound can be increased by determining whether or not the set of product ions extracted by the product ion set extractor is generated by dissociation of the cyclic moiety of the precursor ion derived from the compound candidate.

(Clause 4)

The mass spectrometry method described in any of Clauses 1 to 3 further includes using a compound database storing spectrum data of product ions generated by collision between a precursor ion and an inert gas molecule and/or spectrum data of product ions generated by a reaction between a precursor ion and hydrogen radicals, for a known compound, to estimate a compound candidate for the sample component by collating the first production spectrum data and/or the second product ion spectrum data with product ion spectrum data stored in the compound database.

(Clause 10)

The mass spectrometer described in any of Clauses 7 to 9 further includes:

a compound database storing spectrum data of product ions generated by collision between a precursor ion and an inert gas molecule and/or spectrum data of product ions generated by a reaction between a precursor ion and hydrogen radicals, for a known compound; and a compound estimator configured to estimate a compound candidate for the sample component by collating the first product ion spectrum data and/or the second production spectrum data with product ion spectrum data stored in the compound database.

In the mass spectrometry method described in Clause 4 and the mass spectrometer described in Clause 10, the user can easily estimate a compound candidate for a sample component without collating product ion spectrum data.

(Clause 5)

The mass spectrometry method described in Clause 4 further includes obtaining a score based on a degree of coincidence of product ion spectrum data in the collation for the compound candidate.

(Clause 11)

In the mass spectrometer described in Clause 10, the compound estimator is configured to obtain a score based on a degree of coincidence of spectrum data in the collation for the compound candidate.

The mass spectrometry method described in Clause 5 and the mass spectrometer described in Clause 11 can quantitatively evaluate a certainty of a compound candidate.

(Clause 6)

The mass spectrometry method described in Clauses 3 and 5 further includes adding a predetermined value to the score based on a result of the determination.

(Clause 12)

In the mass spectrometer described in Clauses 9 and 11, the compound estimator is configured to add a predetermined value to the score based on a determination result by the determiner.

In the mass spectrometry method described in Clause 6 and the mass spectrometer described in Clause 12, when a compound having a characteristic in the number or structure of the cyclic moiety is to be identified, the sample component can be quantitatively and accurately identified by increasing the score to be added or the like.

REFERENCE SIGNS LIST

1 . . . Ion Source
2 . . . Ion Trap
21 . . . Ring Electrode
22 . . . Entrance End-Cap Electrode
23 . . . Ion Introduction Hole
24 . . . Exit End-Cap Electrode
25 . . . Ion Emission Hole
26 . . . Radical Introduction Hole
27 . . . Radical Discharge Hole
3 . . . Time-of-Flight Mass Separator
4 . . . Ion Detector
5 . . . Radical Generator/Irradiator
51 . . . Hydrogen Gas Supply Source
52 . . . Radical Generation Chamber
52 . . . Hydrogen Gas Supply Source
53 . . . Radio-Frequency Plasma Source
531 . . . Microwave Supply Source
532 . . . Three-Stub Tuner
54 . . . Nozzle
541 . . . Ground Electrode
542 . . . Torch
543 . . . Needle Electrode
544 . . . Connector
55 . . . Skimmer
56 . . . Valve
58 . . . Transport Pipe
6 . . . Inert Gas Supplier
61 . . . Inert Gas Supply Source
62 . . . Valve
63 . . . Gas Flow Path
71 . . . Trap Voltage Generator
72 . . . Device Controller
80 . . . Ionization Chamber
801 . . . ESI Probe
81 . . . First Intermediate Vacuum Chamber 811 . . . Ion Guide
82 . . . Second Intermediate Vacuum Chamber
821 . . . Ion Guide
83 . . . Analysis Chamber
831 . . . Front-Stage Quadrupole Mass Filter
832 . . . Collision Cell
833 . . . Multipole Ion Guide
834 . . . Rear-Stage Quadrupole Mass Filter
835 . . . Ion Detector
9 . . . Controller/Processor
91 . . . Storage
911 . . . Compound Database
92 . . . Measurement Controller
921 . . . First Measurement Controller
922 . . . Second Measurement Controller
93 . . . Spectrum Creator
94 . . . Product Ion Set Extractor
95 . . . Compound Estimator
98 . . . Input Section
99 . . . Display
C . . . Ion Optical Axis

The invention claimed is:

1. A mass spectrometry method comprising steps of:
acquiring first product ion spectrum data by dissociating a precursor ion derived from a sample component by collision between the precursor ion and an inert gas molecule to generate product ions, and detecting the product ions after separating the product ions according to a mass-to-charge ratio;
acquiring second product ion spectrum data by dissociating the precursor ion by a reaction of the precursor ion with hydrogen radicals to generate product ions, and detecting the product ions after separating the product ions according to a mass-to-charge ratio; and
extracting a set of product ions having a predetermined mass difference in the first product ion spectrum data and the second product ion spectrum data.

2. The mass spectrometry method according to claim 1, wherein
the predetermined mass difference is 2 Da.

3. The mass spectrometry method according to claim 1, wherein
it is further determined whether or not the extracted set of product ions is generated by dissociation of a cyclic moiety of the precursor ion.

4. The mass spectrometry method according to claim 3 further comprising
using a compound database storing spectrum data of product ions generated by collision between a precursor ion and an inert gas molecule and/or spectrum data of product ions generated by a reaction between a precursor ion and hydrogen radicals, for a known compound, to estimate a compound candidate for the sample component by collating the first production spectrum data and/or the second product ion spectrum data with product ion spectrum data stored in the compound database.

5. The mass spectrometry method according to claim 4 further comprising
obtaining a score based on a degree of coincidence of product ion spectrum data in the collation for the compound candidate.

6. The mass spectrometry method according to claim 5 further comprising
adding a predetermined value to the score based on a result of the determination.

7. A mass spectrometer comprising:
a reaction chamber into which a precursor ion derived from a sample component is introduced;
an inert gas introducing section configured to introduce an inert gas into the reaction chamber;
a hydrogen radical introducing section configured to introduce hydrogen radicals into the reaction chamber;
an ion detecting section configured to detect ions emitted from the reaction chamber after separating the ions according to a mass-to-charge ratio;
a first measurement controller which is a controller configured to control the inert gas introducing section and the ion detecting section, the first measurement controller configured to dissociate the precursor ion by collision between the precursor ion and an inert gas molecule to generate product ions, and acquire first product ion spectrum data by detecting the product ions by the ion detecting section;
a second measurement controller which is a controller configured to control the hydrogen radical introducing section and the ion detecting section, the second measurement controller configured to dissociate the precursor ion by a reaction between the precursor ion and hydrogen radicals to generate product ions, and acquire second product ion spectrum data by detecting the product ions by the ion detecting section; and
a product ion set extractor configured to extract a set of product ions having a predetermined mass difference in the first product ion spectrum data and the second production spectrum data obtained for a same precursor ion.

8. The mass spectrometer according to claim 7, wherein the predetermined mass difference is 2 Da.

9. The mass spectrometer according to claim 7 further comprising
a determiner configured to determine whether or not the set of product ions extracted by the product ion set extractor is generated by dissociation of a cyclic moiety of a precursor ion derived from the compound candidate.

10. The mass spectrometer according to claim 7 further comprising:
a compound database storing spectrum data of product ions generated by collision between a precursor ion and an inert gas molecule and/or spectrum data of product ions generated by a reaction between a precursor ion and hydrogen radicals, for a known compound; and
a compound estimator configured to estimate a compound candidate for the sample component by collating the first product ion spectrum data and/or the second product ion spectrum data with product ion spectrum data stored in the compound database.

11. The mass spectrometer according to claim 10, wherein the compound estimator is configured to obtain a score based on a degree of coincidence of spectrum data in the collation for the compound candidate.

12. The mass spectrometer according to claim 11, wherein the compound estimator is configured to add a predetermined value to the score based on a determination result by the determiner.

* * * * *